(12) United States Patent
Albrecht

(10) Patent No.: US 6,557,604 B2
(45) Date of Patent: May 6, 2003

(54) SAFETY LINER FOR A VEHICLE TIRE AND METHOD OF USE

(76) Inventor: Donald Albrecht, 2314 Santa Monica Blvd., Santa Monica, CA (US) 90404

( * ) Notice: Subject to any disclaimer, the term of this patent is extended or adjusted under 35 U.S.C. 154(b) by 167 days.

(21) Appl. No.: 09/788,729

(22) Filed: Feb. 20, 2001

(65) Prior Publication Data

US 2002/0121325 A1 Sep. 5, 2002

(51) Int. Cl.[7] .............................. B06C 17/00; B06C 5/00

(52) U.S. Cl. ....................... 152/516; 152/166; 152/195; 152/450; 156/110.1; 428/34.1

(58) Field of Search ................................. 152/155, 156, 152/157, 165, 166, 195, 196, 247, 248, 249, 250, 251, 450, 516, 520; 156/110.1, 123; 428/34.1, 35.2, 35.7, 36.1

(56) References Cited

U.S. PATENT DOCUMENTS 479,566 A * 7/1892 Latta ........................... 152/384
3,901,301 A * 8/1975 Edwards ...................... 152/521

* cited by examiner

Primary Examiner—Michael W. Ball
Assistant Examiner—Justin Fischer
(74) Attorney, Agent, or Firm—Timothy Thut Tyson; Ted Masters; Freilich, Hornbaker & Rosen

(57) ABSTRACT

A safety liner (20) for a vehicle tire (500) includes a toroidal tube (22) having at least one hole (24). At least one plug (26) is selectively insertable into the at least one hole (24). Toroidal tube (22) is compressible into a flattened circular shape by a compressive force, and when the compressive force is removed, the toroidal tube (22) resiliently assumes its original toroidal shape. Safety liner (20) is installed in the cavity (503) of vehicle tire (500) as the vehicle tire (500) is being installed on the tire rim (502). If a blowout or other leak occurs, safety liner (20) will cause the shape and pressure of vehicle tire (500) to be retained for a period of time.

7 Claims, 8 Drawing Sheets

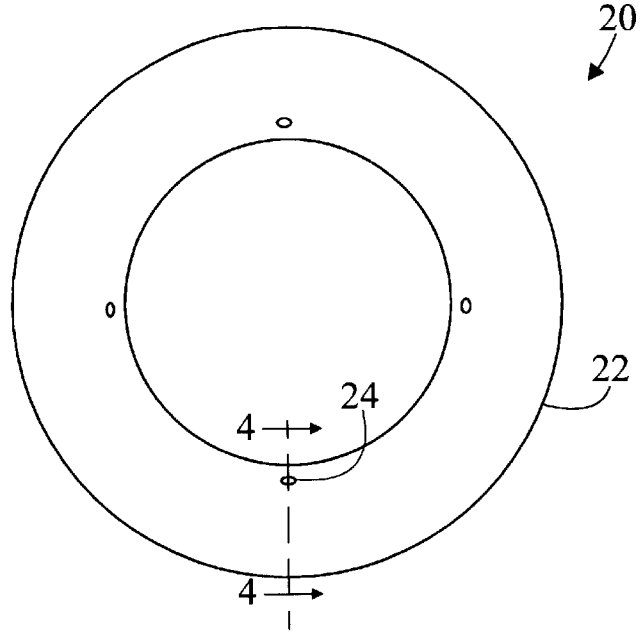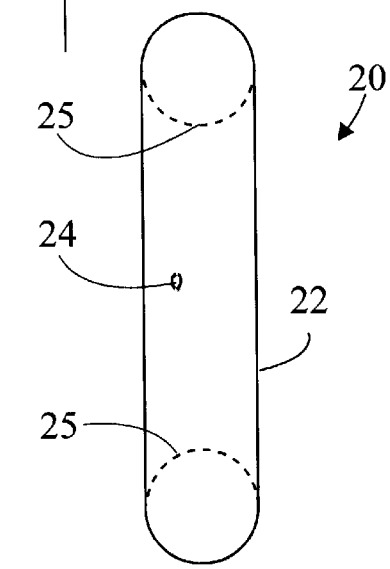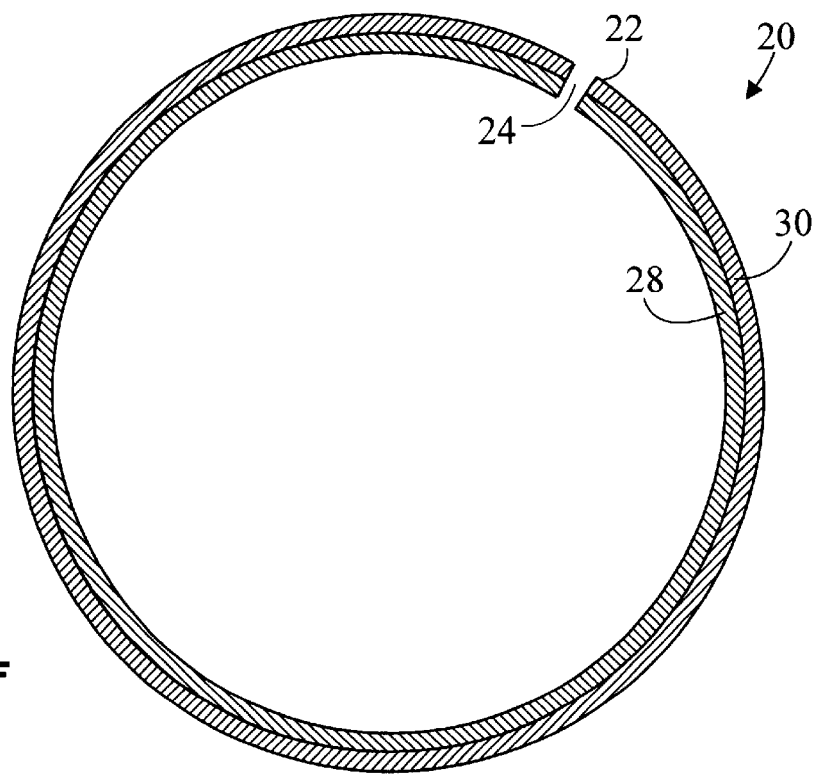

Fig_12

SAFETY LINER FOR A VEHICLE TIRE AND METHOD OF USE

TECHNICAL FIELD

The present invention is directed generally to vehicle tires of the tubeless variety, and more particularly to a safety liner which is inserted inside of the tire. In the event of a blow out, the liner slowly deflates thereby allowing a motorist to safely stop or even continue driving for a short period of time.

BACKGROUND ART

Internal safety structures for vehicle tires are well known in the art. These devices are designed to mitigate against the effects of a blowout. For example, U.S. Pat. No. 2,560,609 shows a tire tube which is built into the regular inner tube of the tire, and has facilities for expanding to fill the tire in case the inner tube has become punctured or torn from the effects of a blow out. The internal tube is designed to expand to full inner tube size to keep the tire in up and running condition until a service station is reached.

U.S. Pat. No. 4,008,743 illustrates a pneumatic tire with an internal toroidal safety structure that expands and provides emergency support between the tire tread and the wheel rim if the tire loses inflation pressure. The safety structure has an outer circumferential belt comprising one or more superposed layers of cord reinforced strips, the belt being secured to the safety structure in a relatively narrow central circumferential zone so that radial expansion of the toroidal safety structure is readily accommodated should the tire lose inflation pressure. The belt bears between the inner surface of the tread portion of the tire and the safety structure in the event of tire deflation or underinflation and thus guards against puncture. The safety structure may be an internal inflatable tube or a flexible resilient foam member.

U.S. Pat. No. 4,153,095 shows a pneumatic insert for a pneumatic tire having a generally toroidal shaped hollow member having a pair of annular insert beads with sidewalls extending therefrom joined to an insert crown portion. An annular flap portion is joined to the outer surface of each insert sidewall at the bead area and extends beyond each bead a predetermined amount. The pneumatic insert is disposed in a standard tire and mounted on standard rim. The insert flaps are tucked between the respective insert beads and the bead support surface of the rim to provide a leak-tight seal. When the insert is inflated, the insert beads push the respective tire beads against the rim flange. In one embodiment, the tire is inflated through an air passage member disposed between the tire and insert beads. In another embodiment, the tire is inflated directly through the tire sidewall with a hypodermic needle. The insert inflation chamber and the tire inflation chamber do not communicate and can be inflated to different pressure levels. Other embodiments of the pneumatic insert include fabric reinforcements and/or protective caps.

U.S. Pat. No. 4,216,809 discloses a run-flat insert structure for a pneumatic tire in which the insert structure comprises a homogeneous elastomeric material and is fully enclosed and pneumatically inflated. The insert structure is mounted within the cavity formed by the pneumatic tire and the wheel rim upon which the tire is mounted. The insert structure is shaped and spaced from the interior walls of the tire such that contact between the insert structure and the interior tire walls is minimized during rated load carrying and inflation conditions of the tire. The volume of the insert structure is less than 50% of the volume of the cavity formed by the tire and the wheel rim to thereby assist in avoiding undesirable contact between the insert structure and the tire. During the deflated condition of the tire, the insert structure supports the tire and its load at a deflection that prevents excessively rapid deterioration of the tire while running in the deflated, run-flat condition.

U.S. Pat. No. 4,231,407 illustrates a protective liner for a tire having a tread portion and housing an inflatable tube, the liner having an elongated panel of puncture resistant material adapted to be extended circumferentially about the tube within the tire; and a pair of ridges borne by the panel extending in spaced, substantially parallel relation along the panel for embedded engagement with the interior of the tire to maintain selected alignment between the tread portion thereof and the panel.

U.S. Pat. No. 4,418,734 shows a safety support system in which an annular safety support of resilient foam material having an outer diameter less than the inner diameter of the tire is positioned around a rim and within the tire. The foam material has closed cells containing gas under pressure for supporting the tire in the deflated condition and expanding in an axial direction to press the bead portions against the bead seats of the rim. The safety support has beads and a fabric reinforced construction at a radially outer wall for controlling expansion beyond the radially outer diameter. A second reinforcing fabric ply may be provided at the radially inner wall for controlling expansion and facilitating field mounting of the safety support.

U.S. Pat. No. 5,099,900 describes a self-healing tire system containing a tire casing, a tacky sealant material, an inner tube, and anti-tack material. In one embodiment, either the surface of the inner tube or the inner surface of the tire casing is coated with the tacky sealant material. The surface of the sealant, the opposing surface, or both are coated with the anti-tack material. The anti-tack material renders the sealant non-tacky for a sufficient time so that the inner tube can be inserted and inflated. However, the anti-tack material allows the sealant surface to become tacky again thereby adhering to the tube and providing for sealing of the tube when it is punctured. In another embodiment, a release agent is contained between the sealant and the tire casing which facilitates removal of the sealant and tube from the tire casing.

U.S. Pat. No. 5,186,771 depicts a ring device for running with a flat tire on a vehicle wheel having a one-piece rim with a drop center. The ring device has articulated sectors and is housed inside the tire where it molds itself at least partially to the shape of the rim. The external surface of the ring is distant from the internal surface of the tread of the tire as long as the tire is in its normal operating condition.

U.S. Pat. No. 5,795,414 is directed to a tire assembly having a puncture resistant capability. The tire assembly includes an inner tube with an outer periphery having a plurality of protruding deflectable structures which are circumferentially continuous about the inner tube body. The deflectable structures have a cross-sectional appearance that is somewhat similar to miniature, hollow fingers. The tire assembly also includes a tire liner that has separator structures which are ridge-like in appearance and which are circumferentially continuous about the tire liner as well. The separator structures and deflectable structures are arrayed so as to mate with one another whereby the structure of the separator structures may assist the deflectable structures in maintaining their finger-like shape when under load. When a tack or other sharp object pierces the tire, it passes harmlessly between the deflectable structure and a separator structure, the deflectable structure being resiliently deflected to the side. A lubricant or insert between the separator structures and the deflectable structures assists in the frictionless deflecture of the deflectable structures. The invention is adaptable to tubeless tires as well.

DISCLOSURE OF INVENTION

The present invention is directed to a safety liner for a vehicle tire. The safety liner can be used with any tubeless pneumatic tire, and prevents the tire from completely collapsing and releasing the tire beads from the rim. When a tire rapidly deflates it can cause a loss of vehicle control. The present invention prevents rapid deflation by providing a liner which loses air slowly. The safety liner is inserted in the tire in a compressed state. One or more plugs are then removed which allow the safety liner to resiliently expand to its normal toroidal shape which partially fills the tire cavity. The safety liner may be removed from a worn out tire and reused. Or, if the safety liner is punctured, it may be repaired in the same manner as a tire.

A major advantage of the safety liner of the present invention, resides in the fact that one size liner can fit a variety of tire and rim models. For example, one size safety liner could be used with most 14 inch rims, another with most 15 inch rims, etc.

In accordance with a preferred embodiment of the invention, a safety liner for a vehicle tire includes a resilient hollow tube-like body in the form of a toroidal tube having at least one hole. At least one plug is selectively insertable into the at least one hole. The body is fabricated from a resilient material and has a normal toroidal shape. The body is compressible into a flattened substantially circular shape by a compressive force, and when the compressive force is removed, the body resiliently returns to its normal toroidal shape.

In accordance with an important aspect of the invention, when in its toroidal state, the body is shaped and dimensioned to circumferentially fit loosely inside the internal cavity of the vehicle tire. That is, the body fills most of the internal cavity of the vehicle tire.

In accordance with an important feature of the invention, the body includes abutting layers of rubber and tire casing fabric. The body is resilient, and after compression will slowly expand to its normal toroidal shape. The body is more rigid than a conventional tire tube.

In accordance with another important aspect of the invention, the hole is positioned so that (1) it is accessible when the safety liner is installed in the internal cavity of the vehicle tire, and (2) so that the hole is located adjacent to the tire bead during a blowout.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 2 is a reduced side elevation view of a safety liner for a vehicle tire in accordance with the present invention;

FIG. 3 is a reduced end elevation view of the safety liner;

FIG. 4 is a cross-sectional view along the line 4—4 of FIG. 2;

MODES FOR CARRYING OUT THE INVENTION

Figure 1:
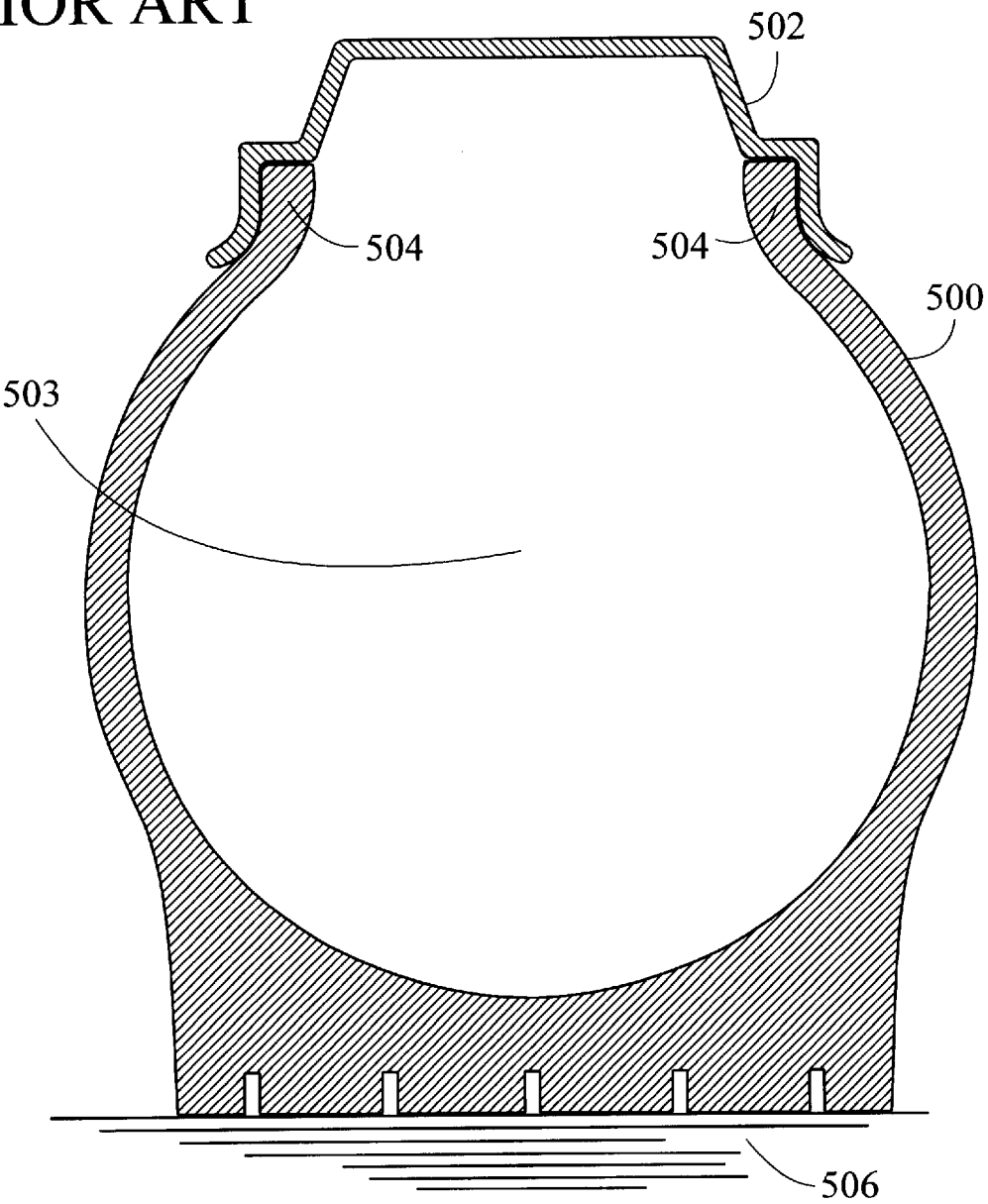
FIG. 1 is a cross-sectional view of a prior art vehicle tire and tire rim.

FIG. 1 illustrates a cross-sectional view of a prior art vehicle tire 500 and tire rim 502. The vehicle tire 500 is installed upon tire rim 502 and filled with air so that the beads 504 of the tire firmly abut tire rim 502. Vehicle tire 500 has an internal cavity 503. Vehicle tire 500 is shown resting upon a support surface 506 such as a road.

FIGS. 2 and 3 illustrate reduced side elevation and end elevation views, respectively, of a safety liner for a vehicle tire in accordance with the present invention, generally designated as 20. Safety liner 20 includes a hollow tube-like body 22 (i.e. a toroidal tube) having at least one hole 24. In a preferred embodiment, four holes 24 each having about a $\frac{1}{8}^{th}$ inch in diameter are utilized. When body 22 is in a toroidal shape, body 22 has an inside portion 25 (dashed line in FIG. 3). At least one hole 24 is disposed on inside portion 25. In a preferred embodiment hole 24 is located in about the position shown in FIG. 4. Positioning hole 24 in this manner ensures that when body 22 is flattened, and when body 22 is inserted into internal cavity 503 of a vehicle tire 500, hole 24 is near tire rim 502 and therefore accessible (refer also to FIG. 9). Also properly positioning hole 24 on inside portion 25, ensures that during a blowout hole 24 will be adjacent to the tire bead and exhaust into a small cavity which is sealed by body 22 (refer to FIG. 12). This will slow the release of air from safety liner 20 and provide a driver with more time to stop or reach a service station. When in a toroidal shape, hollow body 22 is shaped and dimensioned to circumferentially and loosely fit inside tire cavity 503 of vehicle tire 500 (FIG. 1). At least one plug 26 (also refer to FIGS. 7 and 8) is selectively insertable into at least one hole 24. Plug 26 is shaped and dimensioned to provide an airtight seal of hole 24. In a preferred embodiment, plug 26 includes a tab 29 for pulling (for example with pliers) plug 26 from hole 24 when body 22 is installed inside tire cavity 503. In a preferred embodiment, hollow body 22 has a plurality of holes 24, and a corresponding plurality of plugs 26 are insertable into the plurality of holes 24.

FIG. 4 is an enlarged cross-sectional view along the line 4—4 of FIG. 2. In a preferred embodiment, hollow body 22 is comprised of an inner rubber tube 28 and an outer layer of tire casing fabric 30. However, the layers could also be reversed with the rubber tube 28 on the outside and the tire casing fabric 30 on the inside. It may be appreciated that other resilient materials such as a polymer could also be used to fabricate safety liner 20. Air enters hollow body 22 through hole 24 and allows hollow body 22 to expand into a normal torodial state. Hollow body 22 is resilient but also is somewhat ridged (certainly more ridged than a conventional tire tube) when in the expanded torodial shape. Also, other resilient materials such as a polymer could be utilized to fabricate hollow body 22.

Figure 5:
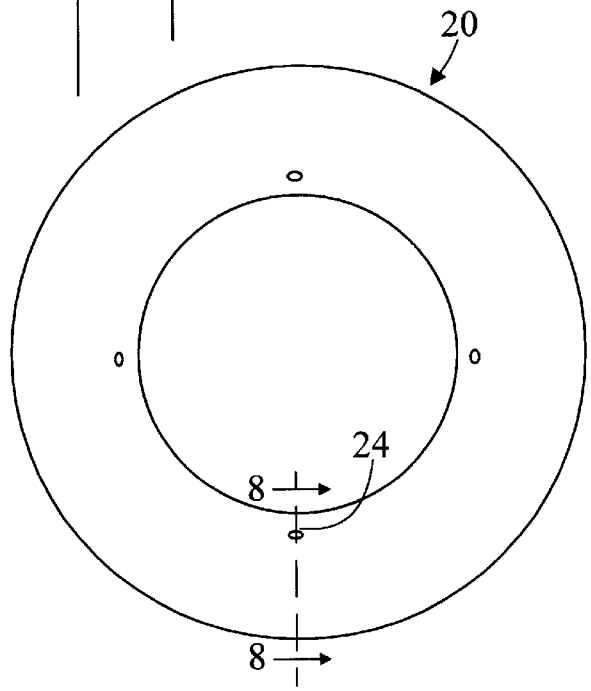
FIG. 5 is a reduced side elevation view of the safety liner in a compressed state.
Figure 6:
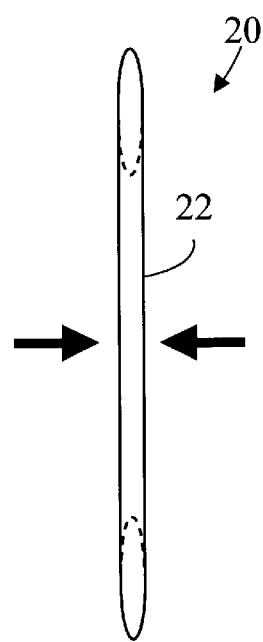
FIG. 6 is a reduced end elevation view of the safety liner in a compressed state.

FIGS. 5 and 6 are reduced side and end elevation views, respectively, of safety liner 20 in a compressed state. Hollow body 22 is compressible into a flattened circular shape by a compressive force such as a weight. When the compressive force is removed, hollow body 22 resiliently assumes a toroidal shape as depicted in FIGS. 2 and 3.

Figure 7:
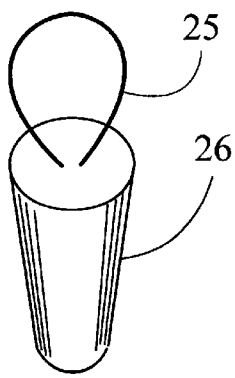
FIG. 7 is an enlarged perspective view of a plug.

FIG. 7 is an enlarged perspective view of plug 26, which selectively provides an airtight seal for hole 24. In a preferred embodiment, plug 26 is fabricated from rubber.

Figure 8:
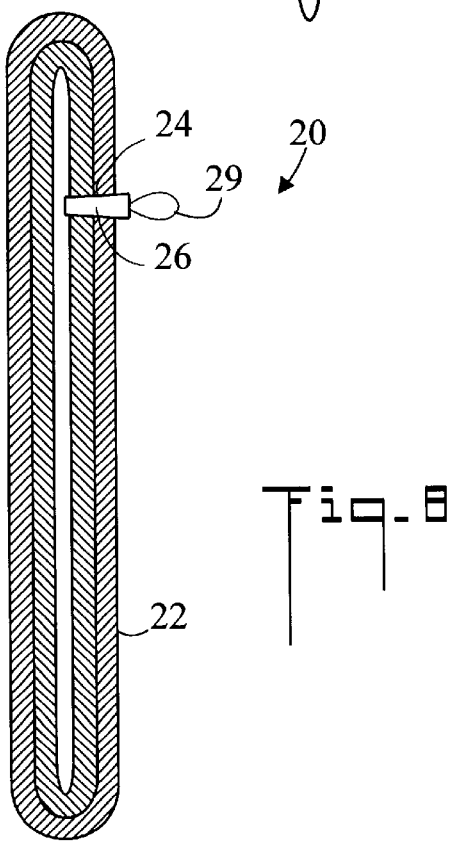
FIG. 8 is a cross-sectional view of the compressed safety liner along the line 8—8 of FIG. 5.

FIG. 8 is a cross-sectional view of the compressed safety liner 20 along the line 8—8 of FIG. 5. Plug 26 has been inserted into and seals hole 24, thereby preventing air from entering hollow body 22. This prevents hollow body 22 from resiliently expanding to its normal toroidal state.

Figure 9:
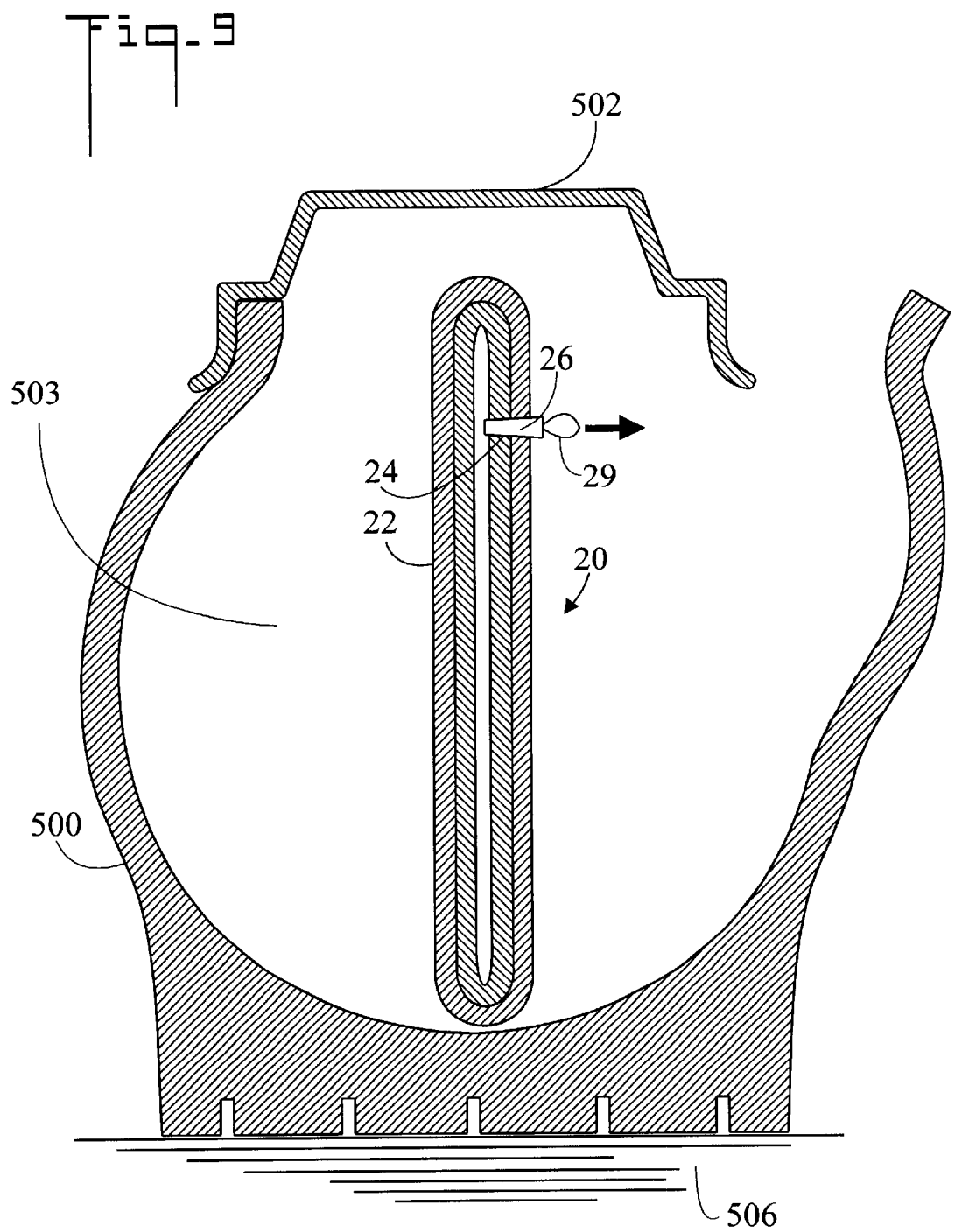
FIG. 9 is a cross-sectional view of a vehicle tire partially installed on a tire rim with the compressed safety liner inserted into the internal cavity of the tire and the plug ready for removal.

FIG. 9 is a cross-sectional view of a vehicle tire 500 partially installed on the tire rim 502 with the compressed safety liner 20 inserted into internet cavity 502 of the tire and the plug 26 ready for removal. It is noted that by positioning hole 24 in the location described for FIGS. 2 through 4 above, plug 26 and tab 29 are readily accessible when the remaining side of vehicle tire 500 is still not installed on tire rim 502. Once plug 26 is pulled, the remaining side of vehicle tire 500 is installed on the rim 502 (refer also to FIG. 10).

Figure 10:
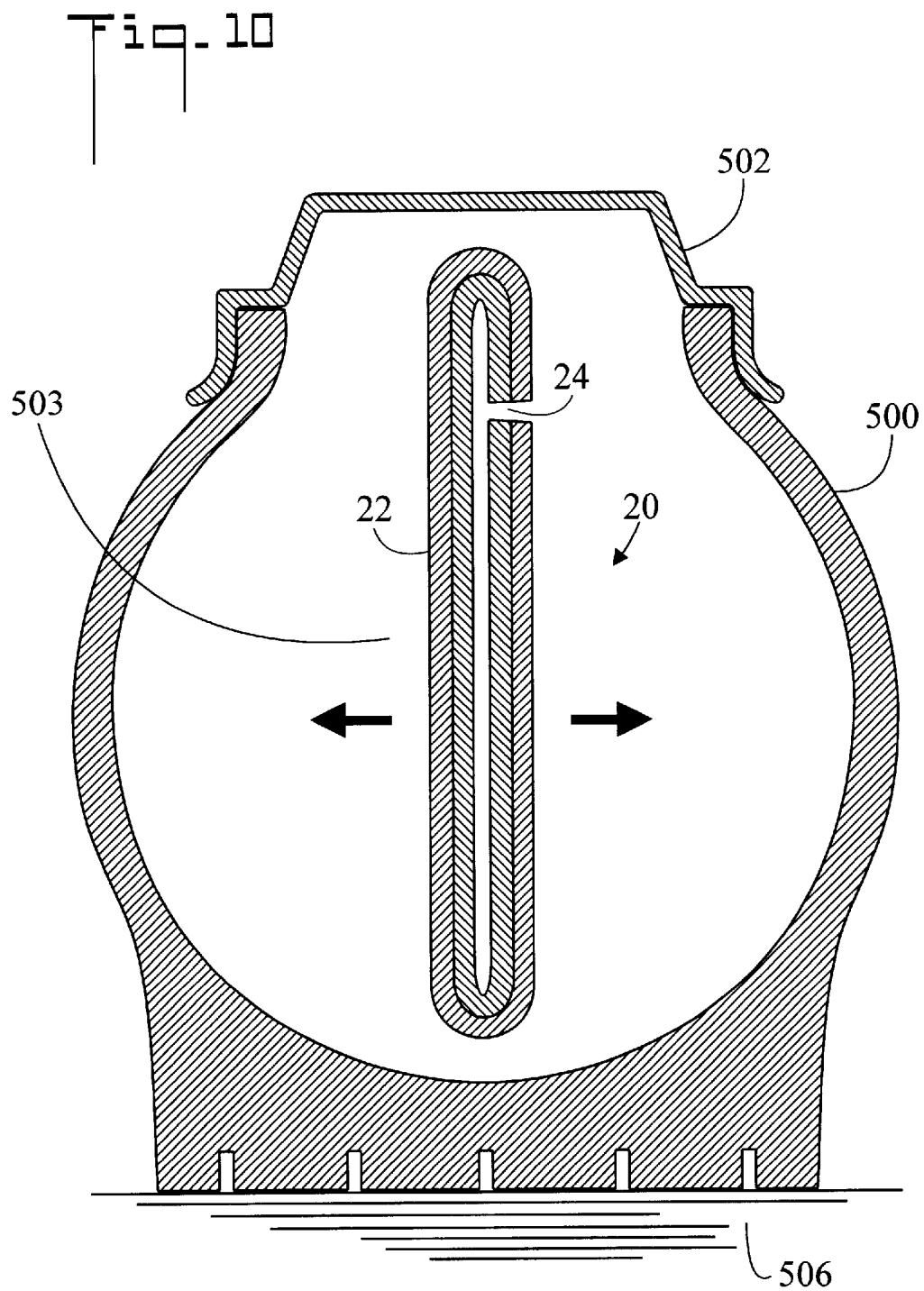
FIG. 10 is a cross-sectional view of a vehicle tire and tire rim with the compressed safety liner installed and the plug removed.

FIG. 10 is a cross-sectional view of a vehicle tire 500 and tire rim 502 with the compressed safety liner 20 installed. Just before seating vehicle tire 500 on tire rim 502, plug 26 is removed allowing air to enter body 22 causing it to slowly expand to its toroidal shape.

Figure 11:
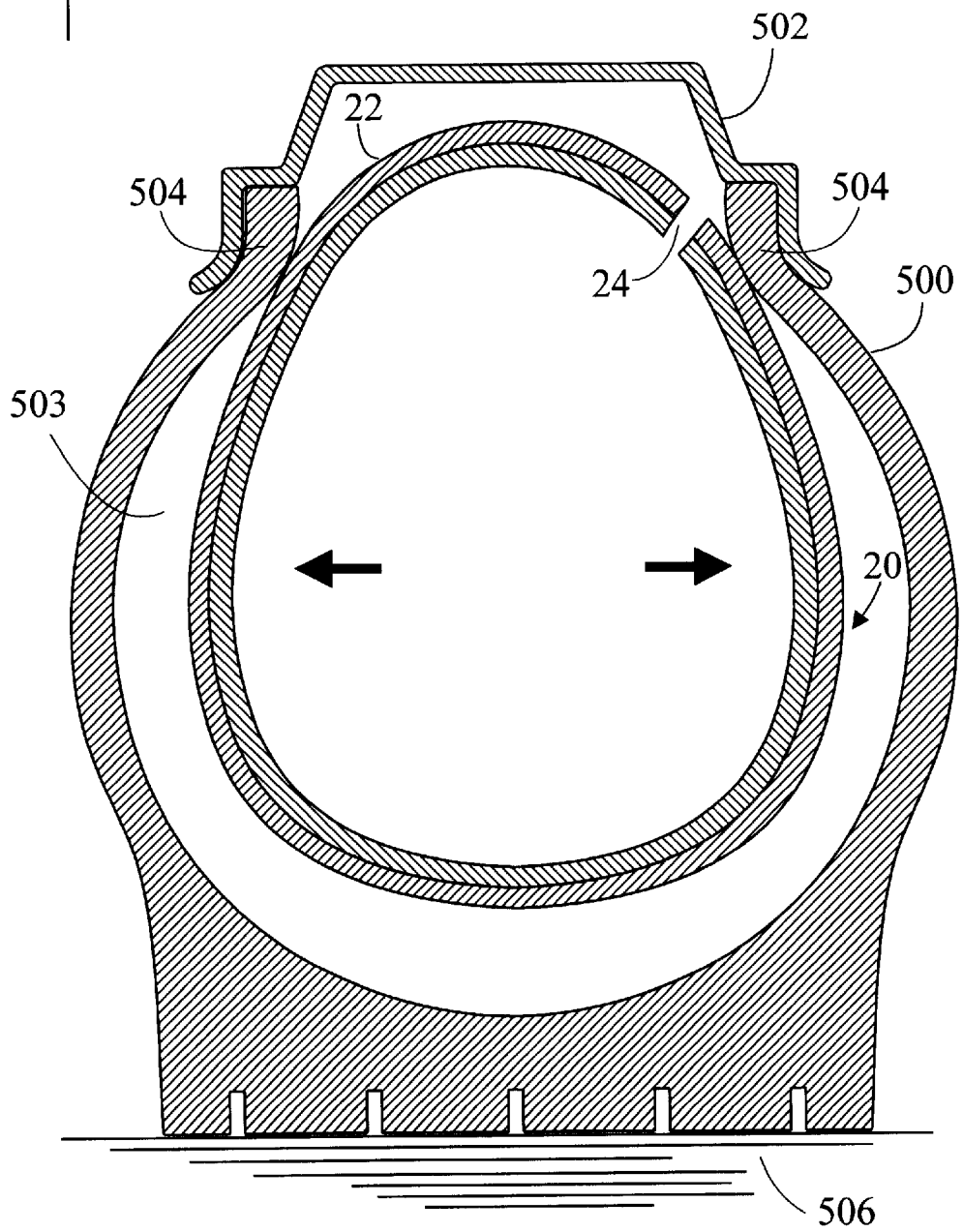
FIG. 11 is a cross-sectional view of the vehicle tire and tire rim with the safety liner expanded to partially fill the tire cavity.

FIG. 11 is a cross-sectional view of vehicle tire 500 and tire rim 502 with the safety liner 20 expanded to loosely fill the tire cavity 503. When vehicle tire 500 and tire rim 502 are pressurized, safety liner 20 will reside at the internal tire pressure. It is noted that when in the shown running condition, safety liner 20 does not entirely fill internal cavity 503 of vehicle tire 500, but rather abuts tire beads 504. If safety liner 20 completely filled internal cavity 503, then a blowout could also damage safety liner 20.

Figure 12:
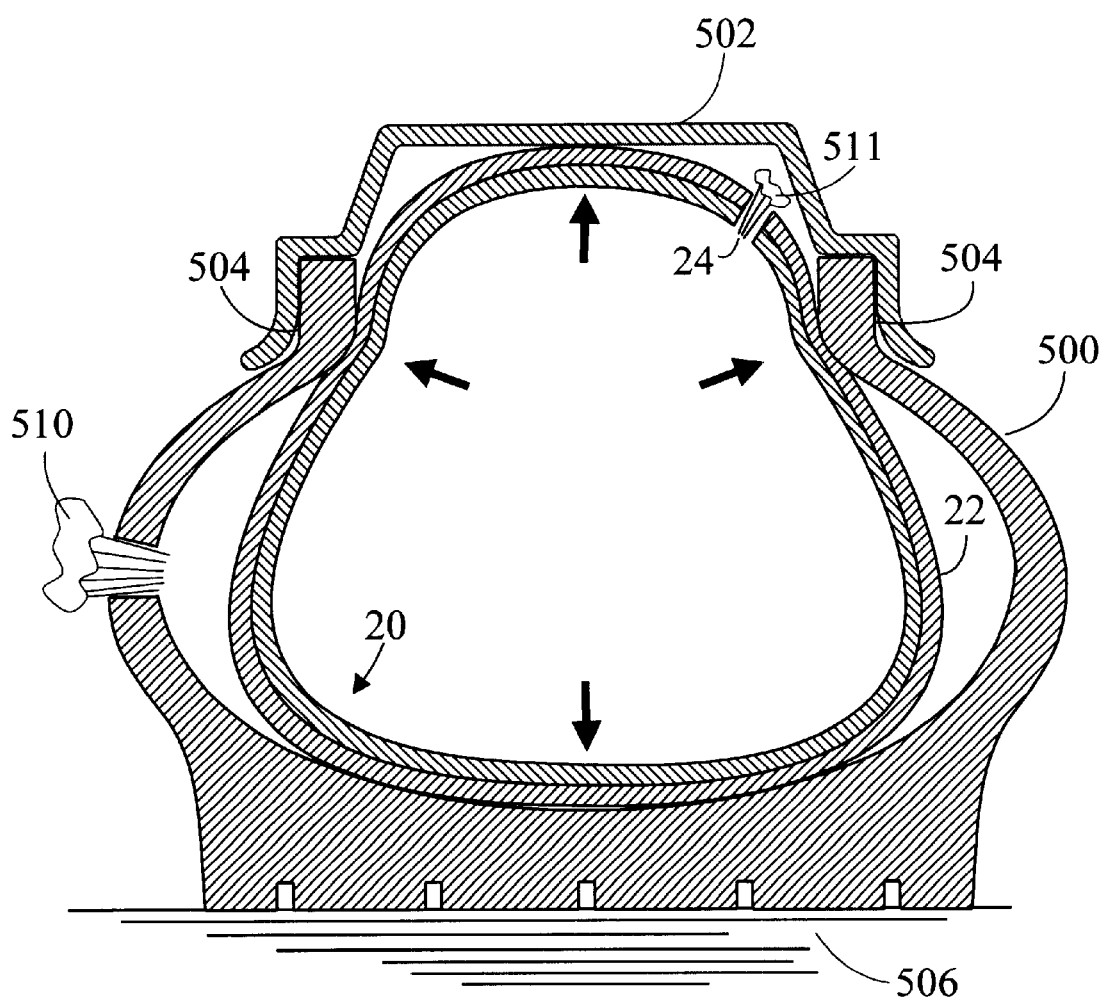
FIG. 12 is a cross-sectional view of the vehicle tire and safety liner during a blowout; and, FIG. 13 is a cross-sectional view of the vehicle tire without the safety liner during a blowout.

FIG. 12 is a cross-sectional view of vehicle tire 500 and safety liner 20 during a blowout or other leak. A small amount of air 510 slowly leaks from vehicle tire 500. The leak is slow because of the residual air pressure (capacitance) inherent in safety liner 20. Air 511 will slowly leak from hole 24, however the slow leak allows a motorist time to safely stop or even to drive a short distance. Safety liner 20 also serves to maintain tire beads 504 in abutting contact with tire rim 502. Additionally, since safety liner 20 seals against the top of tire rim 502 and the tire, the escape of air is reduced. This is another important reason for positioning hole 24 in the location described in the discussion of FIGS. 2 and 3.

Figure 13:
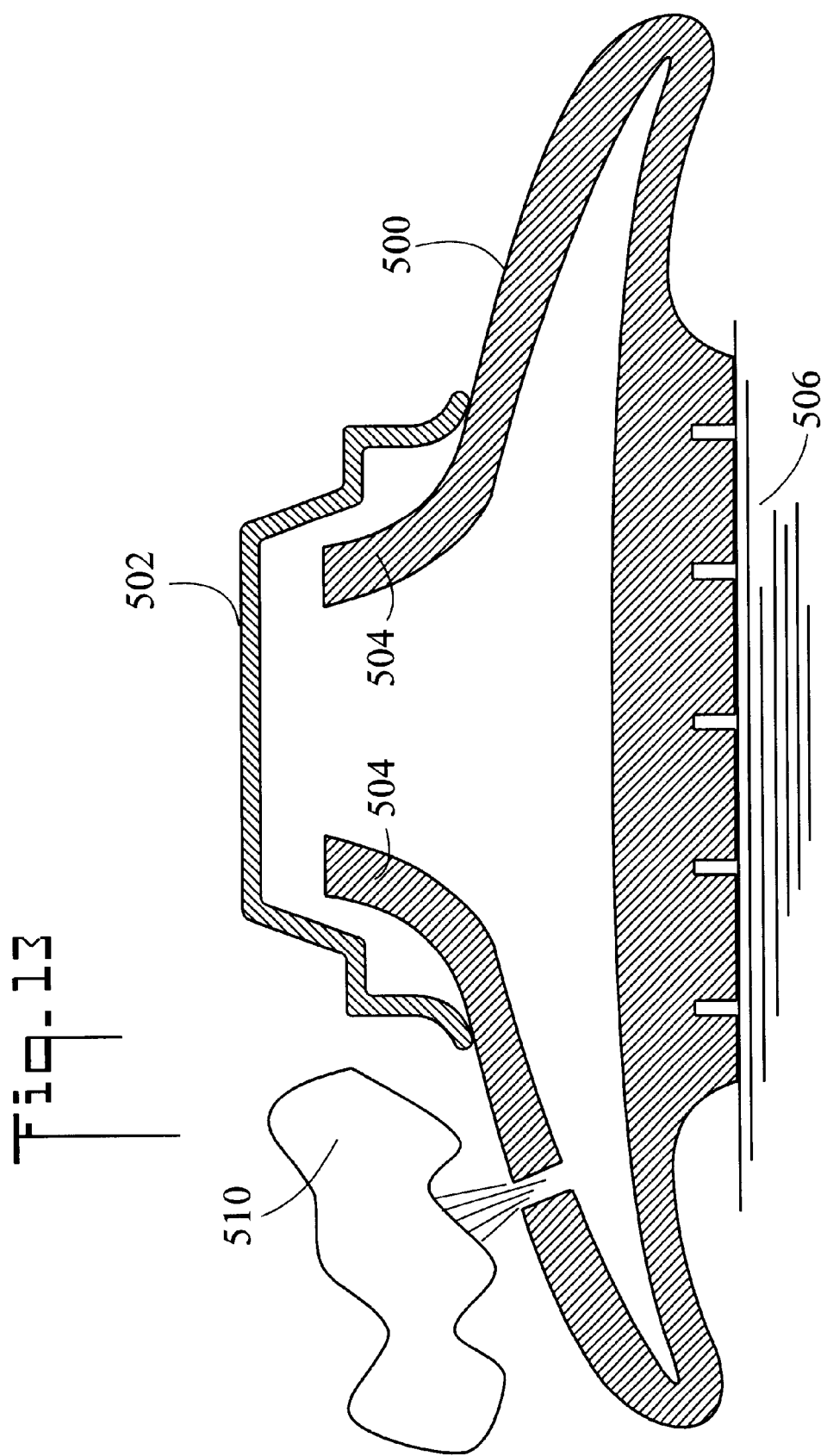

FIG. 13 is a cross-sectional view of a vehicle tire 500 without the safety liner 20 during a blowout. Air 510 rapidly escapes from vehicle tire 500 causing the tire to deform and beads 504 to separate from tire rim 502.

In terms of use, a method for mitigating the effects of a blow out or leak in a vehicle tire 500, comprises: providing a safety liner 20 having a hollow body 22 having at least one hole 24, the body 22 being compressible into a flattened substantially circular shape by a compressive force, and when the compressive force is removed, the body 22 resiliently assuming a toroidal shape; providing at least one plug 26, providing a vehicle tire 500 having an internal cavity 503, and, providing a tire rim 502; compressing body 22 into a flattened substantially circular shape; inserting at least one plug 26 into at least one hole 24, inserting the compressed body 22 into the internal cavity 503 of the vehicle tire 500; removing at least one plug 24; observing that the body 22 commences to resiliently assume a toroidal shape; and, installing the vehicle tire 500 on the tire rim 502.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A safety liner for a vehicle tire, comprising:

a hollow tubular body having at least one hole;

when subjected to a compressive force, air being forced out of said tubular body so that said tubular body assumes a flattened circular shape;

at least one plug selectively insertable into said at least one hole, so that when said tubular body is in said flattened circular shape, said at least one plug may be inserted into said at least one hole thereby preventing air from entering said tubular body and retaining said tubular body in said flattened circular shape;

when said tubular body is in said flattened circular shape and when said at least one plug is removed from said at least one hole, air entering said tubular body through said at least one hole, thereby causing said tubular body to assume said torodial shape; and, said safety liner insertable into the vehicle tire in said flattened circular shape, and thence expanding to said torodial shape upon removal of said at least one plug, so that when the vehicle tire experiences a blow out, said safety liner slowly deflates.

2. A safety liner according to claim 1, further including:

said body having a plurality of holes; and, a corresponding plurality of said plugs insertable into said plurality of holes.

3. A safety liner according to claim 1, the vehicle tire having an internal cavity, said safety liner further including:

when in said toroidal shape, said body shaped and dimensioned to circumferentially fit inside the vehicle tire only partially filling the internal cavity so that a blow out of the vehicle tire will not damage said safety liner.

4. A safety liner according to claim 1, further including:

said body including abutting layers of rubber and tire casing fabric.

5. A safety liner according to claim 1, further including:

said plug including a tab for pulling said plug from said hole.

6. A safety liner according to claim 1 wherein the vehicle tire has a rim, said safety liner further including:

when in said toroidal shape, said body having an inside portion; and, said at least one hole disposed on said inside portion, so that when said safety liner is installed within the vehicle tire, said at least one hole is positioned adjacent to the rim thereby reducing the escape of air from said safety liner during a blow out of the vehicle tire.

7. A method for mitigating the effects of a leak in a vehicle tire, comprising:

providing a hollow tubular body having at least one hole, said body compressible into a flattened circular shape by a compressive force, and when said compressive force is removed, said body resiliently assuming a toroidal shape;

providing at least one plug;

providing a vehicle tire having an internal cavity;

providing a tire rim;

compressing said body into a flattened circular shape;

inserting said at least one plug into said at least one hole;

inserting said compressed body into said internal cavity of said vehicle tire;

removing said at least one plug; and, installing said vehicle tire on said tire rim.

* * * * *